United States Patent
Kong et al.

(10) Patent No.: US 11,728,736 B2
(45) Date of Patent: Aug. 15, 2023

(54) NON-DISSIPATIVE OUTPUT VOLTAGE TRANSITION FOR AN ISOLATED SWITCHING POWER CONVERTER

(71) Applicant: DIALOG SEMICONDUCTOR INC., Campbell, CA (US)

(72) Inventors: Pengju Kong, Campbell, CA (US); Tao Li, Campbell, CA (US); Jiaji Qi, Campbell, CA (US); Zhi Yang, Campbell, CA (US); Jianming Yao, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 209 days.

(21) Appl. No.: 17/211,773

(22) Filed: Mar. 24, 2021

(65) Prior Publication Data

US 2022/0311343 A1 Sep. 29, 2022

(51) Int. Cl.
*H02M 3/335* (2006.01)
*H02M 1/00* (2006.01)

(52) U.S. Cl.
CPC ..... *H02M 3/33523* (2013.01); *H02M 1/0048* (2021.05); *H02M 3/33584* (2013.01); *H02M 3/33592* (2013.01)

(58) Field of Classification Search
CPC ......... H02M 3/33523; H02M 3/33592; H02M 3/33584
See application file for complete search history.

(56) References Cited

U.S. PATENT DOCUMENTS

| | | | | |
|---|---|---|---|---|
| 6,771,518 | B2* | 8/2004 | Orr | H02M 3/33576 363/39 |
| 8,154,236 | B2* | 4/2012 | Kimura | H02M 7/4807 318/400.26 |
| 9,660,544 | B1* | 5/2017 | Telefus | H02M 3/33592 |
| 9,887,564 | B2* | 2/2018 | Fahlenkamp | H02M 3/33523 |
| 10,965,218 | B1* | 3/2021 | Odell | H02M 1/34 |
| 11,258,371 | B2* | 2/2022 | Giuliano | H02M 1/4208 |
| 2002/0114174 | A1* | 8/2002 | Hatta | H02M 3/33592 363/21.06 |
| 2003/0151929 | A1* | 8/2003 | Figueroa | H02M 3/33507 363/21.01 |
| 2005/0207188 | A1* | 9/2005 | Takashima | H02M 1/38 363/21.14 |
| 2019/0245452 | A1* | 8/2019 | Portisch | H02M 3/33584 |

* cited by examiner

*Primary Examiner* — Kyle J Moody
(74) *Attorney, Agent, or Firm* — Haynes and Boone, LLP

(57) ABSTRACT

A flyback converter includes a synchronous rectifier switch transistor controlled by a controller. The controller cycles the synchronous rectifier switch transistor to lower an output voltage by transferring energy from a secondary-side output capacitor to a primary-side input capacitor.

17 Claims, 4 Drawing Sheets

NON-DISSIPATIVE OUTPUT VOLTAGE TRANSITION FOR AN ISOLATED SWITCHING POWER CONVERTER

TECHNICAL FIELD

This application relates to switching power converters, and more particularly to an isolated switching power converter with non-dissipative output voltage transition.

BACKGROUND

A flyback switching power converter is typically used to charge a mobile device as the converter's transformer provides safe isolation from AC household current. It is conventional for the switching power converter to couple to the device being charged through a standard interface such as a Universal Serial Bus (USB) interface. The USB interface includes a differential pair of signals (D+ and D−) for signaling and also provides power and ground. With regard to the delivery of power, a USB cable can only provide a certain amount of current. For example, the USB 2.0 standard allows for a maximum output current of 500 mA whereas the USB 3.0 standard allows a maximum output current of 900 mA. Traditionally, the delivery of power through a USB cable occurs using an output voltage of five volts. But modern mobile device batteries typically have a storage capacity of several thousand milliamps. The charging of such batteries, even at the increased output currents allowed in the USB 3.0 standard, would thus be delayed if the power is delivered using a five-volt output voltage. This charging delay is exacerbated since the switching power supply, the USB cable, and the receiving device all present a resistance to the output current.

To enable a rapid charge mode in light of the output current limitations and associated losses from device resistances, it is conventional to use markedly higher output voltages over the USB cable. For example, rather than use the default USB output voltage of 5 V, rapid charging modes have been developed that use 9V, 12V, or even 19V. The increased voltages allow the switching power supply to deliver more power over the USB cable without exceeding the maximum output current limitations. However, many legacy devices can only accommodate the standard 5V from a USB cable. Should a user disconnect the cable from a device being charged with the elevated output voltage and reconnect to a legacy device, the legacy device may be damaged. In addition, a mobile device may command for the output voltage to be lowered to the default level. It is thus conventional for flyback converters to be required to return the output voltage to a default level within a relatively short period in response to a triggering event such as a cable disconnect or a command.

A flyback converter 100 is shown in FIG. 1 having a conventional response to such a triggering event. During normal operation, a controller such as a primary-side controller 105 controls the cycling of a power switch transistor SW to regulate an output voltage Vout delivered over a data cable 120 to a portable device 115 such as a cellular telephone. A transformer T includes a primary winding that receives a rectified input voltage Vin such as from the rectification of an AC mains input voltage. A secondary winding of the transformer T couples to an output capacitor Cout that supports the output voltage Vout. To respond to a triggering event to lower the output voltage from an elevated level, flyback converter 100 switches on a switch S1 coupled between ground and an output voltage rail that supports the output voltage Vout. The charge on the output capacitor Cout will thus flow from the output voltage rail through switch S1 so that the output voltage Vout decreases. When the output voltage has reached the default level, flyback converter 100 opens the switch S1. To prevent an excessive current from flowing through switch S1 while the output voltage transitions, switch S1 may be in series with an external resistor R, which raises manufacturing costs. In addition, a secondary-side controller (not illustrated) will typically require an extra pin or terminal to control switch S1, which further increase manufacturing costs and complexity. Note that there may be an intermittent connection between data cable 120 and converter 100 such as due to a damage to data cable 120 or to the corresponding socket or interface on converter 100. A transition of the output voltage may then be triggered multiple times within a relatively short period. The resulting heat dissipated in resistor R and switch S1 may stress converter 100. In addition, substantial energy may then be discharged to ground, which lowers the operating efficiency of converter 100.

SUMMARY

In accordance with an aspect of the disclosure, a flyback converter is disclosed that includes: a transformer having a primary-side winding and a secondary-side winding; an input capacitor coupled to the primary-side winding; an output capacitor coupled to the secondary-side winding; a synchronous rectifier switch transistor coupled to the secondary-side winding; and a controller configured to cycle the synchronous rectifier switch transistor during an output voltage transition period to lower an output voltage for the flyback converter through a transfer of energy from the output capacitor to the input capacitor.

In accordance with another aspect of the disclosure, a method of operating a flyback converter is disclosed that includes: during a normal mode of operation, cycling a power switch transistor so that energy flows from an input capacitor to an output capacitor; and during an output voltage transition mode of operation, cycling a synchronous rectifier switch so that energy flows from the output capacitor to the input capacitor to lower an output voltage.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An improved isolated switching power converter is provided. The following discussion will be directed to flyback converter implementations, but it will be appreciated that the output voltage transitions disclosed herein may be advantageously employed for the driving of any suitable isolated switching power converter. To efficiently lower the output voltage in response to a triggering event such as a cable disconnect or a command from a portable device, a secondary-side controller such as synchronous rectifier (SR) controller cycles a secondary-side SR switch transistor. The SR switch transistor is switched on while a power switch transistor on the primary-side of the transformer is off. After an on-time for the SR switch transistor, the secondary-side controller cycles the SR switch transistor off. A primary-side controller may then cycle on the power switch transistor so that energy transferred from a secondary-side output capacitor into the transformer's core may then be transferred from the transformer's core into a primary-side input capacitor. Alternatively, a body diode for the power switch transistor may conduct to perform this energy transfer in lieu of actually driving a gate voltage for the power switch transistor to cycle it on.

Figure 1:
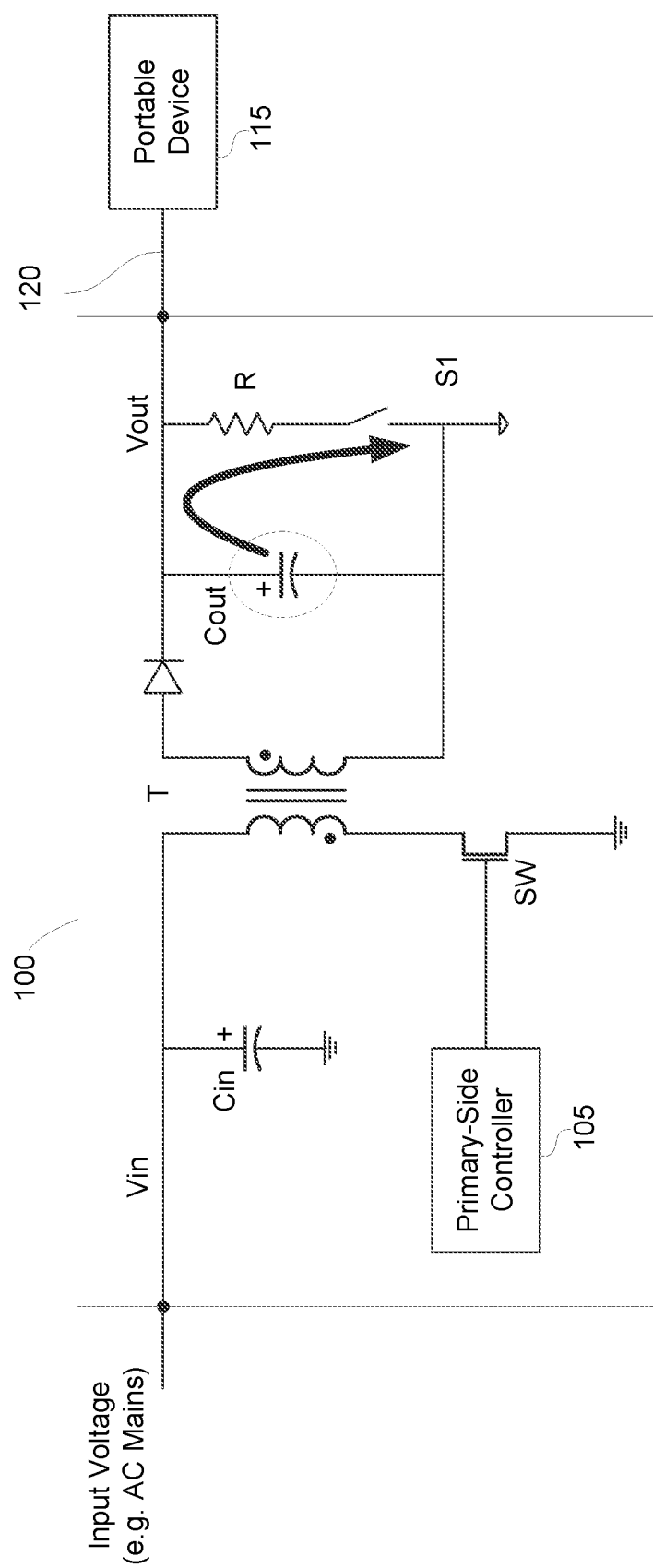
FIG. 1 illustrates a flyback converter configured to implement a conventional output voltage transition from an elevated level to a default level in response to a triggering event.
Figure 2:
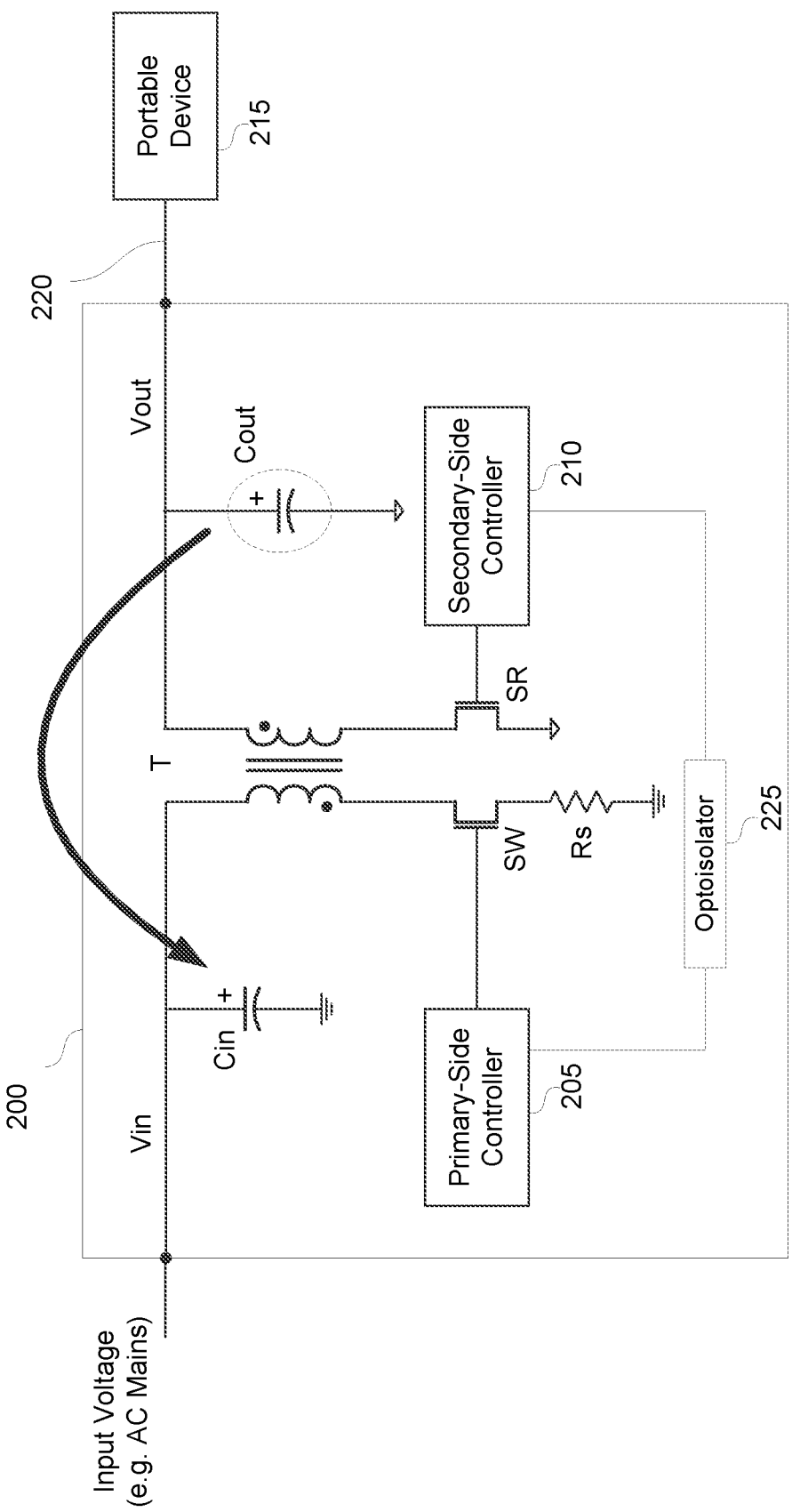
FIG. 2 illustrates an improved flyback converter configured to implement an output voltage transition in which energy is transferred from a secondary-side output capacitor to a primary-side input capacitor in response to a triggering event in accordance with an aspect of the disclosure.

The resulting energy transfer from the output capacitor to the input capacitor advantageously lowers the output voltage in response to the triggering event without the dangers of excessive heat production or damagingly-high current levels. In addition, the energy transfer increases power efficiency as the energy is stored in the input capacitor instead of being discharged into ground. An example flyback converter 200 is shown in FIG. 2. During normal operation, a controller such as a primary-side controller 205 controls the cycling of a power switch transistor SW to regulate an output voltage Vout delivered over a data cable 220 to a portable device 215 such as a cellular telephone. A transformer T includes a primary winding that receives a rectified input voltage Vin such as from the rectification of an AC mains input voltage. A primary-side input capacitor Cin that couples between ground and an input voltage rail stores the input voltage Vin. A secondary winding of the transformer T couples to an output capacitor Cout that stores the output voltage Vout. To respond to a triggering event to lower the output voltage from an elevated level, a secondary-side controller 210 such as an SR controller switches on an SR switch transistor that couples between ground and the secondary winding.

The triggering event may be either a disconnect of the portable device 215 from data cable 220 or a disconnect of the data cable 220 from flyback converter 200. Alternatively, the triggering event may be a command to lower the output voltage from the portable device to the flyback converter 200 as delivered over the data cable 220. To monitor for the triggering event, secondary-side controller 210 may monitor a data channel in data cable 220. For example, in embodiments in which data cable 220 is a USB cable, secondary-side controller 210 may monitor the D+ and D− terminals to the USB cable. Should the secondary-side controller 210 receive a command over the data channel to lower the output voltage, a triggering event is confirmed. Alternatively, secondary-side controller 210 may detect the triggering event by detecting that the data channel is no longer coupled to the portable device 215 through a disconnect of the data cable 220 from flyback converter 200 and/or from portable device 215.

Regardless of how the triggering event is detected, secondary-side controller 210 will then cycle the SR switch transistor on and off over a series of SR switching cycles once secondary-side controller 210 is assured that the power switch transistor SW is off. For example, prior to beginning the cycling of the SR switch transistor to lower the output voltage, secondary-side controller 210 may alert the primary-side controller that the triggering event has been detected through a signal sent through a ground-isolating channel such as an optoisolator 225. Primary-side controller 205 may then cease the cycling of power switch transistor SW so that the output voltage transition may begin.

Figure 3:
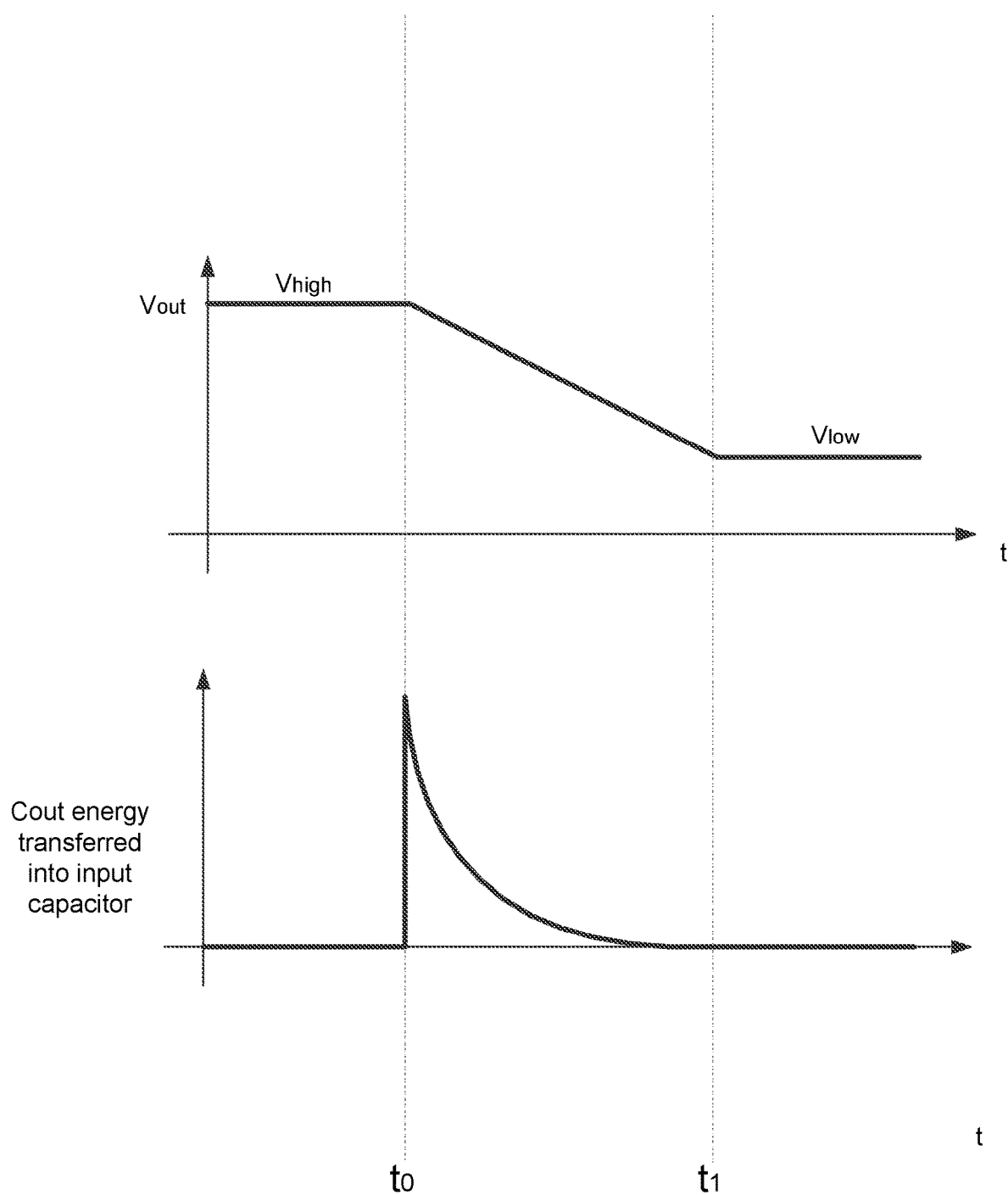
FIG. 3 illustrates some operating waveforms for the improved flyback converter of FIG. 2.

Some operating waveforms for flyback converter 200 are shown in FIG. 3. The output voltage transition in response to a detection of the triggering event begins at a time t0 and ends at a time t1. The duration of the output voltage transition may be defined by a user. In some implementations, the duration of the output voltage transition from an increased voltage Vhigh at time t10 to a reduced voltage Vlow at time t1 may be 100 ms. It will be appreciated, however, that this duration may be shorter or longer in alternative implementations. FIG. 3 also illustrates the energy transfer waveform from time t0 to time t1 with regard to the energy transfer from the output capacitor Cout to the input capacitor Cin. This energy transfer will depend upon the cycling rate of the SR switch transistor and the duty cycle. In general, the secondary-side controller 210 will control the on-time for the SR switch transistor so that the power converter 200 is not stressed by any excessive currents. An example switching period is several microseconds, but it will be appreciated that the switching period may be smaller or larger in alternative implementations. The on-time duration is also arbitrary and may be lengthened or shortened depending upon the design. For example, an on-time duration and switching period may be such that the duty cycle is less than 50% (the ratio of the on-time duration to the switching period). But this duty cycle may be greater or smaller in alternative implementations. An increase in the duty cycle increase the energy transfer rate from the output capacitor to the input capacitor. Conversely, a decrease in the duty cycle reduces the amount this energy transfer rate.

Figure 4:
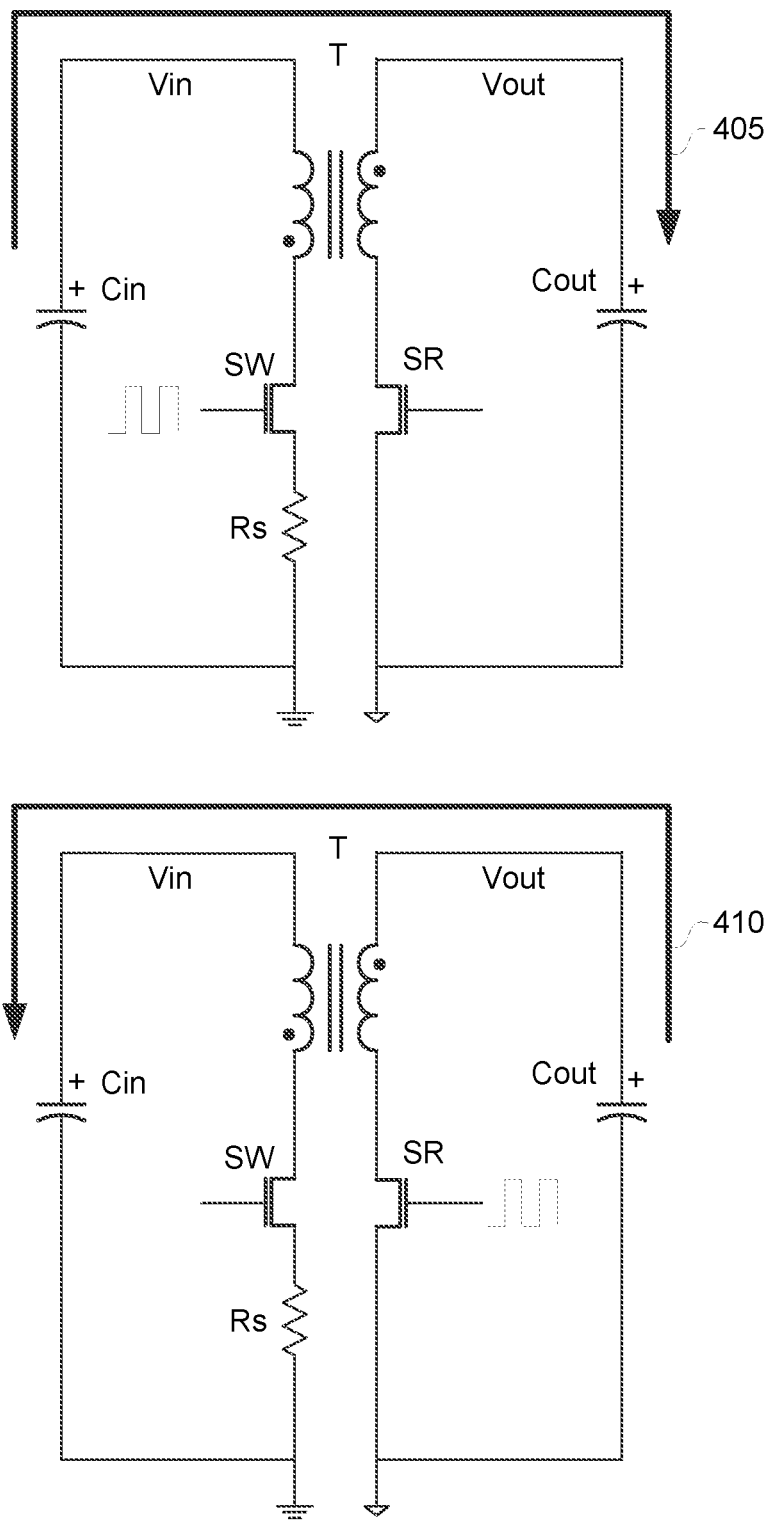
FIG. 4 illustrates the energy flow during normal operation of the improved flyback converter and also during an output voltage transition in response to a triggering event.

In general, a duty cycle and switching period should be selected so that the output voltage transition may be completed in the desired output voltage transition period (the delay between time t1 and time t0). In each cycle of the SR switch transistor, the primary-side controller 205 may switch on the power switch transistor SW in response to the cycling off of the SR switch transistor so that the primary side current may flow. This primary-side current flow is in the opposite direction that flows during normal operation. The cycling of the power switch transistor SW during normal operation to regulate the output voltage Vout is illustrated in FIG. 4. Energy is effectively transferred from the input capacitor Cin to the output capacitor Cout as illustrated by energy flow direction 405. During the on-time of the power switch transistor SW in normal operation, the primary-side current flows from the input rail supporting the input voltage Vin through the power switch transistor SW and a sense resistor Rs into ground. After the power switch transistor SW is cycled off, the SR switch transistor is switched on so that the secondary current flows from ground through the secondary winding to charge the output capacitor Cout with the output voltage Vout. These primary-side and secondary-side current directions are reversed during an output voltage transition period so that energy may flow 410 from the output capacitor Cout to the input capacitor Cin. During the output voltage transition period, the secondary-side current flows from the output capacitor Cout through the secondary winding and into ground. After the SR switch transistor is cycled off, the primary-side current flows from ground through the primary winding to charge the input capacitor Cin. The SR switch transistor is thus the master during the output voltage transition period whereas it was the power switch transistor SW that was the master during normal operation. The on-time period for the SR switch during the output voltage transition magnetizes the transformer's magnetizing inductance. This stored energy is then transferred to the input capacitor Vin when the primary-winding current flows at the cycling on of the power switch transistor SW after the SR switch transistor is switched off. In alternative embodiments, the primary-side controller 205 may simply allow the body diode in the power switch transistor SW to conduct this resetting current rather than actively switching on the power switch transistor SW.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
   a transformer having a primary-side winding and a secondary-side winding;
   an input capacitor coupled to the primary-side winding;
   an output capacitor coupled to the secondary-side winding;
   a synchronous rectifier switch transistor coupled to the secondary-side winding; and
   a controller configured to cycle the synchronous rectifier switch transistor during an output voltage transition period to lower an output voltage for the flyback converter through a transfer of energy from the output capacitor to the input capacitor, wherein the controller is further configured to cycle the synchronous rectifier switch transistor in response to a detection of a triggering event to begin the output voltage transition period.

2. The flyback converter of claim 1, wherein the controller is further configured to detect the triggering event in response to a portable device disconnect from the flyback converter.

3. The flyback converter of claim 1, wherein the controller is further configured to detect the triggering event in response to a command from a portable device connected to the flyback converter.

4. The flyback converter of claim 1, wherein the controller is further configured to cycle the synchronous rectifier switch transistor with a constant switching period during the output voltage transition period.

5. The flyback converter of claim 4, wherein the controller is further configured to cycle the synchronous rectifier switch transistor with a constant on-time period during the output voltage transition period.

6. The flyback converter of claim 5, wherein a ratio of the constant on-time period to the constant switching period is less than one-half.

7. The flyback converter of claim 1, wherein the controller is a secondary-side controller, the flyback converter further comprising:
   a ground-isolating channel;
   a power switch transistor coupled to the primary-side winding; and
   a primary-side controller, wherein the secondary-side controller is configured to transmit an alert through the ground-isolating channel to stop the primary-side controller from cycling the power switch transistor during the output voltage transition period.

8. The flyback converter of claim 7, wherein the ground-isolating channel comprises an optoisolator.

9. The flyback converter of claim 7, wherein the power switch transistor is configured to conduct a resetting current through a body diode during off-time periods of the synchronous rectifier switch transistor in the output voltage transition period.

10. The flyback converter of claim 1, wherein the controller is further configured to cycle the synchronous rectifier switch transistor during the output voltage transition period to lower the output voltage for the flyback converter to a default level.

11. The flyback converter of claim 10, wherein the default level is approximately five volts.

12. The flyback converter of claim 1, wherein the controller is a secondary-side controller, the flyback converter further comprising:
   a power switch transistor coupled to the primary-side winding; and
   a primary-side controller configured to cycle on the power switch transistor during off-time periods of the synchronous rectifier switch transistor in the output voltage transition period.

13. A method of operating a flyback converter comprising:
   during a normal mode of operation, cycling a power switch transistor so that energy flows from an input capacitor to an output capacitor;
   initiating an output voltage transition mode of operation in response to a disconnect of a portable device from the flyback converter or in response to a command from the portable device; and
   during the output voltage transition mode of operation, cycling a synchronous rectifier switch transistor so that energy flows from the output capacitor to the input capacitor to lower an output voltage.

14. The method of claim 13, further comprising:
   ceasing the cycling of the synchronous rectifier switch transistor to end the output voltage transition mode of operation in response to the output voltage lowering to a default level.

15. The method of claim 14, wherein the default level is approximately five volts.

16. The method of claim 13, further comprising:
conducting a resetting current through a body diode of the power switch transistor in response to a cycling off of the synchronous rectifier switch transistor during the output voltage transition mode of operation.

17. The method of claim 13, further comprising:
driving a gate voltage of a power switch transistor in response to a cycling off of the synchronous rectifier switch transistor to cause the power switch transistor to conduct a resetting current during the output voltage transition mode of operation.

* * * * *